(12) United States Patent
Pascolini

(10) Patent No.: US 11,089,562 B2
(45) Date of Patent: Aug. 10, 2021

(54) ELECTRONIC DEVICES HAVING MULTI-BAND SATELLITE NAVIGATION CAPABILITIES

(71) Applicant: Apple Inc., Cupertino, CA (US)

(72) Inventor: Mattia Pascolini, San Fransisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/292,129

(22) Filed: Mar. 4, 2019

(65) Prior Publication Data

US 2020/0288426 A1   Sep. 10, 2020

(51) Int. Cl.
 *H04W 64/00* (2009.01)
(52) U.S. Cl.
 CPC .................. *H04W 64/00* (2013.01)
(58) Field of Classification Search
 CPC . H01Q 1/00; H01Q 1/241–244; H04W 64/00; G01S 19/421
 USPC ...................................................... 455/456.1
 See application file for complete search history.

(56) References Cited

U.S. PATENT DOCUMENTS

| | | | |
|---|---|---|---|
| 6,025,816 A | 2/2000 | Dent et al. | |
| 9,431,706 B2 | 8/2016 | Chang et al. | |
| 10,020,579 B1 | 7/2018 | Zheng et al. | |
| 10,027,023 B1 | 7/2018 | Kim et al. | |
| 2006/0152408 A1* | 7/2006 | Leinonen | G01S 19/36 342/357.59 |
| 2012/0299785 A1* | 11/2012 | Bevelacqua | H01Q 5/328 343/702 |
| 2013/0122831 A1* | 5/2013 | Desclos | H04B 1/525 455/78 |
| 2014/0141799 A1* | 5/2014 | Rousu | H04W 24/00 455/456.1 |
| 2014/0274179 A1* | 9/2014 | Zhu | H04W 52/243 455/509 |
| 2015/0071137 A1* | 3/2015 | Thiam | H04B 7/0413 370/297 |

(Continued)

OTHER PUBLICATIONS

Chen, Xiaodong, et al., Antennas for Global Navigation Satellite Systems, John Wiley & Sons, 2012.

(Continued)

*Primary Examiner* — Farid Seyedvosoghi
(74) *Attorney, Agent, or Firm* — Treyz Law Group, P.C.; Michael H. Lyons; Matthew R. Williams

(57) ABSTRACT

An electronic device may be provided with first and second antennas and satellite navigation receiver circuitry. The first antenna may receive first satellite navigation signals in a first satellite navigation frequency band such as the L5 band. The second antenna may receive second satellite navigation signals in a second satellite navigation frequency band such as the L1 band. Control circuitry may process the satellite navigation signals received in the first and second satellite navigation frequency bands to identify a geographic location of the electronic device with a high degree of precision and accuracy. The first and second antennas may transmit radio-frequency signals in non-satellite frequency bands such as cellular telephone bands using a multiple-input and multiple-output scheme. The antennas may include antenna resonating elements formed from segments of peripheral conductive housing structures for the electronic device.

19 Claims, 7 Drawing Sheets

(56) References Cited

U.S. PATENT DOCUMENTS

2016/0073416 A1* 3/2016 Kalkunte ............ H04W 64/003
　　　　　　　　　　　　　　　　　　　　　　455/452.2
2016/0377733 A1* 12/2016 Navsariwala ........... G01S 19/14
　　　　　　　　　　　　　　　　　　　　　　342/357.29
2018/0231667 A1* 8/2018 Ye ......................... G01S 13/003

OTHER PUBLICATIONS

Fezai, Faycel, et al., Low-Profile Dual-band Circularly Polarized Microstrip Antenna for GNSS Applications, 2015 9th European Conference on Antennas and Propagation (EuCAP). IEEE, 2015.

* cited by examiner

ELECTRONIC DEVICES HAVING MULTI-BAND SATELLITE NAVIGATION CAPABILITIES

BACKGROUND

This relates to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

To satisfy consumer demand for small form factor wireless devices, manufacturers are continually striving to implement wireless communications circuitry such as antenna components using compact structures. At the same time, there is a desire for wireless devices to cover a growing number of communications bands. For example, it may be desirable for a wireless device to cover both cellular telephone frequency bands and satellite navigation frequency bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over the desired range of operating frequencies.

It would therefore be desirable to be able to provide improved wireless communications circuitry for wireless electronic devices.

SUMMARY

An electronic device may be provided with wireless circuitry and a housing having peripheral conductive housing structures. The wireless circuitry may include first and second antennas, satellite navigation receiver circuitry, and non-satellite transceiver circuitry.

The first antenna may be coupled to a first port on the satellite navigation receiver circuitry and the second antenna may be coupled to a second port on the satellite navigation receiver circuitry. The first antenna may receive first satellite navigation signals in a first satellite navigation frequency band. The second antenna may receive second satellite navigation signals in a second satellite navigation frequency band. The first satellite navigation frequency band may include the L5 frequency band and the second satellite navigation frequency band may include the L1 frequency band used in performing satellite navigation operations, as an example. Control circuitry on the electronic device may process the satellite navigation signals received in the first and second satellite navigation frequency bands to identify a geographic location of the electronic device with a high degree of precision and accuracy.

In one suitable arrangement, the first antenna may be coupled to a third port on the non-satellite transceiver circuitry and the second antenna may be coupled to a fourth port on the non-satellite transceiver circuitry. The first and second antennas may convey non-satellite radio-frequency signals in one or more non-satellite frequency bands (e.g., cellular telephone frequency bands, wireless local area network frequency bands, etc.) using the third and fourth ports. If desired, the wireless circuitry may include third and fourth antennas that also cover the non-satellite frequency bands. Two or more of the first, second, third, and fourth antennas may concurrently convey radio-frequency signals in the same non-satellite frequency bands using a multiple-input and multiple-output (MIMO) scheme. The first, second, third, and fourth antennas may include antenna resonating elements formed from respective segments of the peripheral conductive housing structures.

DETAILED DESCRIPTION

Figure 1:
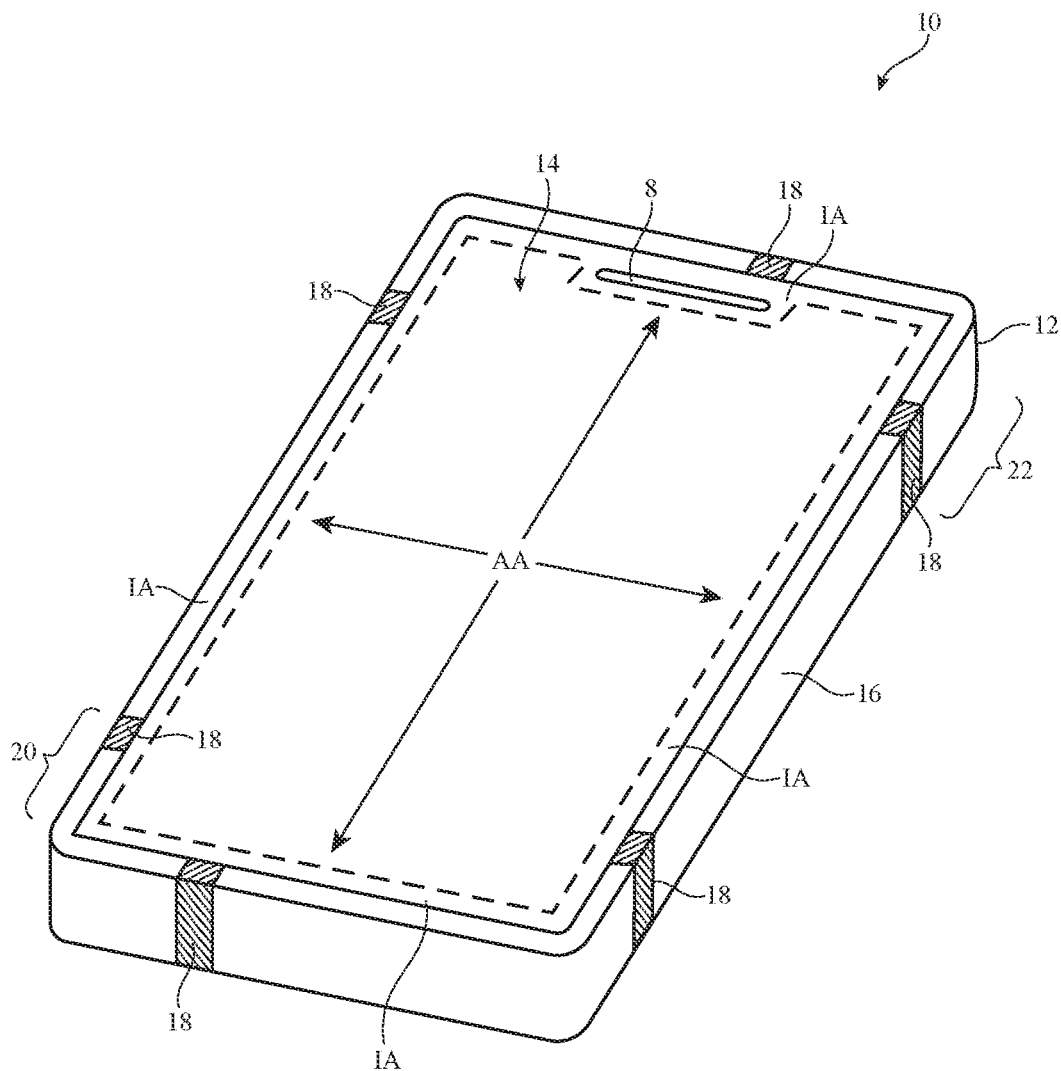
FIG. 1 is a perspective view of an illustrative electronic device in accordance with some embodiments.

Electronic devices such as electronic device 10 of FIG. 1 may be provided with wireless communications circuitry. The wireless communications circuitry may be used to support wireless communications in multiple wireless communications bands.

The wireless communications circuitry may include one or more antennas. The antennas of the wireless communications circuitry can include loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures.

The conductive electronic device structures may include conductive housing structures. The housing structures may include peripheral structures such as peripheral conductive structures that run around the periphery of the electronic device. The peripheral conductive structures may serve as a bezel for a planar structure such as a display, may serve as sidewall structures for a device housing, may have portions that extend upwards from an integral planar rear housing (e.g., to form vertical planar sidewalls or curved sidewalls), and/or may form other housing structures.

Gaps may be formed in the peripheral conductive structures that divide the peripheral conductive structures into peripheral segments. One or more of the segments may be used in forming one or more antennas for electronic device 10. Antennas may also be formed using an antenna ground plane and/or an antenna resonating element formed from conductive housing structures (e.g., internal and/or external structures, support plate structures, etc.).

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a rear housing wall (e.g., a planar housing wall). The rear housing wall may have slots that pass entirely through the rear housing wall and that therefore separate housing wall portions (rear housing wall portions and/or sidewall portions) of housing 12 from each other. The rear housing wall may include conductive portions and/or dielectric portions. If desired, the rear housing wall may include a planar metal layer covered by a thin layer or coating of dielectric such as glass, plastic, sapphire, or ceramic. Housing 12 (e.g., the rear housing wall, sidewalls, etc.) may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Display 14 may include pixels formed from light-emitting diodes (LEDs), organic LEDs (OLEDs), plasma cells, electrowetting pixels, electrophoretic pixels, liquid crystal display (LCD) components, or other suitable pixel structures. A display cover layer such as a layer of clear glass or plastic may cover the surface of display 14 or the outermost layer of display 14 may be formed from a color filter layer, thin-film transistor layer, or other display layer. If desired, buttons may pass through openings in the cover layer. The cover layer may also have other openings such as an opening for speaker port 8.

Housing 12 may include peripheral housing structures such as structures 16. Structures 16 may run around the periphery of device 10 and display 14. In configurations in which device 10 and display 14 have a rectangular shape with four edges, structures 16 may be implemented using peripheral housing structures that have a rectangular ring shape with four corresponding edges (as an example). Peripheral structures 16 or part of peripheral structures 16 may serve as a bezel for display 14 (e.g., a cosmetic trim that surrounds all four sides of display 14 and/or that helps hold display 14 to device 10). Peripheral structures 16 may, if desired, form sidewall structures for device 10 (e.g., by forming a metal band with vertical sidewalls, curved sidewalls, etc.).

Peripheral housing structures 16 may be formed of a conductive material such as metal and may therefore sometimes be referred to as peripheral conductive housing structures, conductive housing structures, peripheral metal structures, peripheral conductive housing sidewall structures, peripheral conductive housing sidewalls, peripheral conductive sidewalls, or a peripheral conductive housing member (as examples). Peripheral conductive housing structures 16 may be formed from a metal such as stainless steel, aluminum, or other suitable materials. One, two, three, four, five, six, or more than six separate structures may be used in forming peripheral conductive housing structures 16.

It is not necessary for peripheral conductive housing structures 16 to have a uniform cross-section. For example, the top portion of peripheral conductive housing structures 16 may, if desired, have an inwardly protruding lip that helps hold display 14 in place. The bottom portion of peripheral conductive housing structures 16 may also have an enlarged lip (e.g., in the plane of the rear surface of device 10). Peripheral conductive housing structures 16 may have substantially straight vertical sidewalls, may have sidewalls that are curved, or may have other suitable shapes. In some configurations (e.g., when peripheral conductive housing structures 16 serve as a bezel for display 14), peripheral conductive housing structures 16 may run around the lip of housing 12 (i.e., peripheral conductive housing structures 16 may cover only the edge of housing 12 that surrounds display 14 and not the rest of the sidewalls of housing 12).

If desired, housing 12 may have a conductive rear surface or wall. For example, housing 12 may be formed from a metal such as stainless steel or aluminum. The rear surface of housing 12 may lie in a plane that is parallel to display 14. In configurations for device 10 in which the rear surface of housing 12 is formed from metal, it may be desirable to form parts of peripheral conductive housing structures 16 as integral portions of the housing structures forming the rear surface of housing 12. For example, a conductive rear housing wall of device 10 may be formed from a planar metal structure and portions of peripheral conductive housing structures 16 on the sides of housing 12 may be formed as flat or curved vertically extending integral metal portions of the planar metal structure. Housing structures such as these may, if desired, be machined from a block of metal and/or may include multiple metal pieces that are assembled together to form housing 12. The conductive rear wall of housing 12 may have one or more, two or more, or three or more portions. Peripheral conductive housing structures 16 and/or the conductive rear wall of housing 12 may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide structures 16 and/or the conductive rear wall of housing 12 from view of the user).

Display 14 may have an array of pixels that form an active area AA that displays images for a user of device 10. An inactive border region such as inactive area IA may run along one or more of the peripheral edges of active area AA.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a backplate) that spans the walls of housing 12 (e.g., a substantially rectangular sheet formed from one or more metal parts that is welded or otherwise connected between opposing sides of peripheral conductive housing structures 16). The backplate may form an exterior rear surface of device 10 or may be covered by layers such as thin cosmetic layers, protective coatings, and/or other coatings that may include dielectric materials such as glass, ceramic, plastic, or other structures that form the exterior surfaces of device 10 and/or serve to hide the backplate from view of the user. Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 16 and opposing conductive ground structures such as conductive portions of the rear wall of housing 12, conductive traces on a printed circuit board, conductive electrical components in display 14, etc.). These openings, which may sometimes be referred to as gaps or slots, may be filled with air, plastic, ceramic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 20 and 22. If desired, the ground plane that is under active area AA of display 14 and/or other metal structures in device 10 may have portions that extend into parts of the ends of device 10 (e.g., the ground may extend towards the dielectric-filled openings in regions 20 and 22), thereby narrowing the slots in regions 20 and 22.

In general, device 10 may include any suitable number of antennas (e.g., one or more, two or more, three or more, four or more, etc.). The antennas in device 10 may be located at opposing first and second ends of an elongated device housing (e.g., in regions 20 and 22 of housing 12 of FIG. 1), along one or more edges of the device housing, in the center of the device housing, in other suitable locations, or in one or more of these locations. The arrangement of FIG. 1 is merely illustrative.

Portions of peripheral conductive housing structures 16 may be provided with peripheral gap structures. For example, peripheral conductive housing structures 16 may be provided with one or more gaps such as gaps 18, as shown in FIG. 1. The gaps in peripheral conductive housing structures 16 may be filled with dielectric such as polymer, ceramic, glass, air, other dielectric materials, or combinations of these materials. Gaps 18 may divide peripheral conductive housing structures 16 into one or more peripheral conductive segments. There may be, for example, two peripheral conductive segments in peripheral conductive housing structures 16 (e.g., in an arrangement with two gaps 18), three peripheral conductive segments (e.g., in an arrangement with three gaps 18), four peripheral conductive segments (e.g., in an arrangement with four gaps 18), six peripheral conductive segments (e.g., in an arrangement with six gaps 18), etc. The segments of peripheral conductive housing structures 16 that are formed in this way may form parts of antennas in device 10.

If desired, openings in housing 12 such as grooves that extend partway or completely through housing 12 may extend across the width of the rear wall of housing 12 and may penetrate through the rear wall of housing 12 to divide the rear wall into different portions. These grooves may also extend into peripheral conductive housing structures 16 and may form antenna slots, gaps 18, and other structures in device 10. Polymer or other dielectric may fill these grooves and other housing openings. In some situations, housing openings that form antenna slots and other structure may be filled with a dielectric such as air.

In a typical scenario, device 10 may have one or more upper antennas and one or more lower antennas (as an example). An upper antenna may, for example, be formed at the upper end of device 10 in region 22. A lower antenna may, for example, be formed at the lower end of device 10 in region 20. The antennas may be used separately to cover identical communications bands, overlapping communications bands, or separate communications bands. The antennas may be used to implement an antenna diversity scheme and/or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, near-field communications, etc. If desired, one or more of the antennas may be used to cover both satellite navigation system communications and cellular telephone communications.

Figure 2:
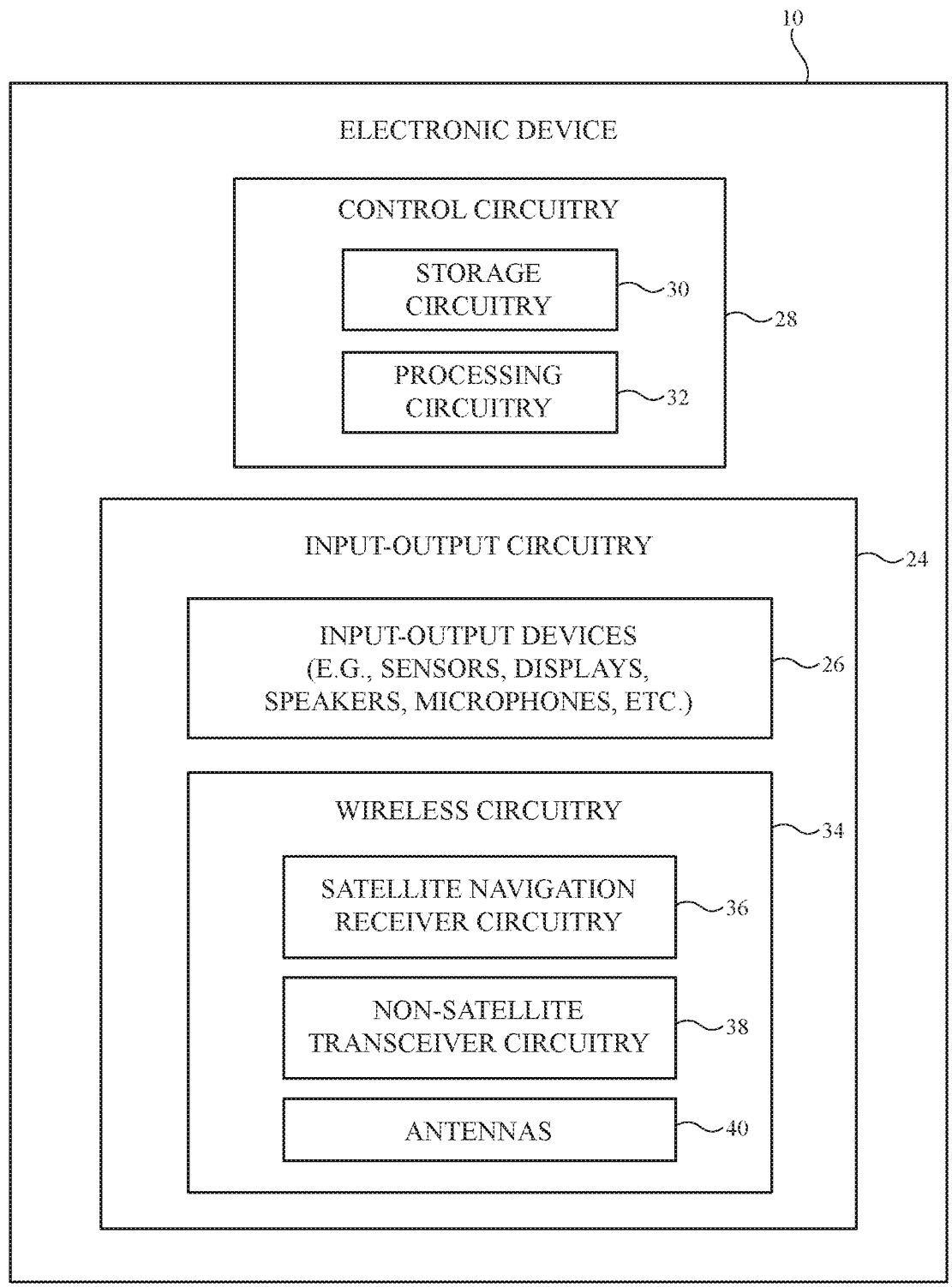
FIG. 2 is a schematic diagram of illustrative circuitry in an electronic device in accordance with some embodiments.

A schematic diagram showing illustrative components that may be used in device 10 is shown in FIG. 2. As shown in FIG. 2, device 10 may include control circuitry 28. Control circuitry 28 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may include processing circuitry such as processing circuitry 32. Processing circuitry 32 may be used to control the operation of device 10. Processing circuitry 32 may include on one or more microprocessors, microcontrollers, digital signal processors, host processors, baseband processor integrated circuits, application specific integrated circuits, central processing units (CPUs), etc. Control circuitry 28 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 28 may be used to run software on device 10 such as satellite navigation applications, internet browsing applications, voice-over-internet-protocol (VOIP)

telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols (e.g., global positioning system (GPS) protocols, global navigation satellite system (GLONASS) protocols, etc.), or any other desired communications protocols. Each communications protocol may be associated with a corresponding radio access technology (RAT) that specifies the physical connection methodology used in implementing the protocol.

Device 10 may include input-output circuitry 24. Input-output circuitry 24 may include input-output devices 26. Input-output devices 26 may be used to allow data to be supplied to device 10 and to allow data to be provided from device 10 to external devices. Input-output devices 26 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 24 may include wireless circuitry such as wireless circuitry 34 (sometimes referred to herein as wireless communications circuitry 34) for wirelessly conveying radio-frequency signals. While control circuitry 28 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 28 (e.g., portions of control circuitry 28 may be implemented on wireless circuitry 34). As an example, control circuitry 28 (e.g., processing circuitry 32) may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry for handling various radio-frequency communications bands. For example, wireless circuitry 34 may include satellite navigation receiver circuitry 36. Satellite navigation receiver circuitry 36 may include global positioning system (GPS) receiver equipment and may therefore sometimes be referred to herein as GPS receiver circuitry 36. Satellite navigation receiver circuitry 36 may receive radio-frequency signals in one or more satellite navigation frequency bands (sometimes referred to herein as satellite navigation signals). The satellite navigation signals may be transmitted (broadcast) towards Earth by satellites in space. The satellite navigation signals may include data that has been encoded using a satellite navigation protocol (e.g., a GPS protocol).

Control circuitry 28 may process received satellite navigation signals to identify a geographic location of device 10. In some scenarios, satellite navigation signals in a single satellite navigation frequency band may be used to identify the location of device 10. If desired, satellite navigation signals in multiple satellite navigation frequency bands may be used to identify the location of device 10. Satellite navigation signals in different satellite navigation frequency bands may be received concurrently by one or more antennas in device 10. Performing satellite navigation operations using multiple satellite navigation frequency bands in this way may, for example, increase the accuracy and/or precision of the geographic location for device 10 relative to scenarios where only a single satellite navigation frequency band is used.

Examples of satellite navigation frequency bands (e.g., GPS frequency bands) that may be handled by satellite navigation receiver circuitry 36 include the L1 band (e.g., at 1575 MHz), the L2 band (e.g., at 1228 MHz), the L3 band (e.g., at 1381 MHz), the L4 band (e.g., at 1380 MHz), and the L5 band (e.g., at 1176 MHz). Each satellite navigation frequency band has a corresponding satellite navigation protocol that may be used by control circuitry 28 and satellite navigation receiver circuitry 36 to identify the geographic location of device 10. Different sets of satellites may broadcast satellite navigation signals towards Earth in one or more of these satellite navigation frequency bands. For example, a first set of satellites may transmit satellite navigation signals in some of these frequency bands (e.g., the L1 band) whereas a second set of satellites may transmit satellite navigation signals in other frequency bands (e.g., the L5 band). Satellite navigation receiver circuitry 36 may include respective ports for receiving satellite navigation signals in different satellite navigation frequency bands.

In one suitable arrangement that is sometimes described herein as an example, satellite navigation receiver circuitry 36 concurrently receives first satellite navigation signals in the L1 frequency band from a first set of satellites and receives second satellite navigation signals in the L5 frequency band from a second set of satellites. However, this example is merely illustrative. In general, satellite navigation receiver circuitry 36 may handle satellite navigation signals in any combination of two or more satellite navigation frequency bands. As new satellite technology is deployed over time, the satellite navigation frequency bands may change and/or additional satellite navigation frequency bands may be introduced. Satellite navigation receiver circuitry 36 may handle any desired satellite navigation frequency bands at any desired frequencies.

As shown in FIG. 2, wireless circuitry 34 may also include non-satellite transceiver circuitry 38. Non-satellite transceiver circuitry 38 may handle communications bands other than satellite navigation frequency bands such as 2.4 GHz and 5 GHz bands for Wi-Fi® (IEEE 802.11) communications or communications in other wireless local area network (WLAN) bands, the 2.4 GHz Bluetooth® communications band or other wireless personal area network (WPAN) bands, and/or cellular telephone frequency bands such as a cellular low band (LB) from 600 to 960 MHz, a cellular low-midband (LMB) from 1410 to 1510 MHz, a cellular midband (MB) from 1710 to 2170 MHz, a cellular high band (HB) from 2300 to 2700 MHz, a cellular ultrahigh band (UHB) from 3400 to 3600 MHz, or other communications bands between 600 MHz and 4000 MHz or other suitable frequencies (as examples).

Non-satellite transceiver circuitry 38 may handle voice data and non-voice data. Wireless circuitry 34 may include circuitry for other short-range and long-range wireless links if desired. For example, wireless circuitry 34 may include 60 GHz transceiver circuitry (e.g., millimeter wave transceiver circuitry), circuitry for receiving television and radio signals, paging system transceivers, near field communications (NFC) circuitry, etc.

Wireless circuitry 34 may include antennas 40. Antennas 40 may be formed using any suitable types of antenna structures. For example, antennas 40 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of two or more of these designs, etc. Different types of antennas may be used for different bands and combinations of bands.

Space is often at a premium in electronic devices such as device 10. In order to minimize space consumption within device 10, the same antenna 40 may be used to cover multiple frequency bands. In one suitable arrangement that is described herein as an example, one or more antennas 40 in device 10 may handle satellite navigation signals in addition to radio-frequency signals in one or more cellular telephone frequency bands. Radio-frequency signals in frequency bands other than the satellite navigation frequency bands (e.g., radio-frequency signals in cellular telephone frequency bands, WPAN frequency bands, WLAN frequency bands, etc.) may sometimes be referred to herein as non-satellite radio-frequency signals. Frequency bands other than the satellite navigation frequency bands (e.g., cellular telephone frequency bands, WPAN frequency bands, WLAN frequency bands, etc.) may sometimes be referred to herein as non-satellite frequency bands. Multiple antennas 40 that handle communications in non-satellite frequency bands may be operated together using a multiple-input and multiple-output (MIMO) scheme.

Figure 3:
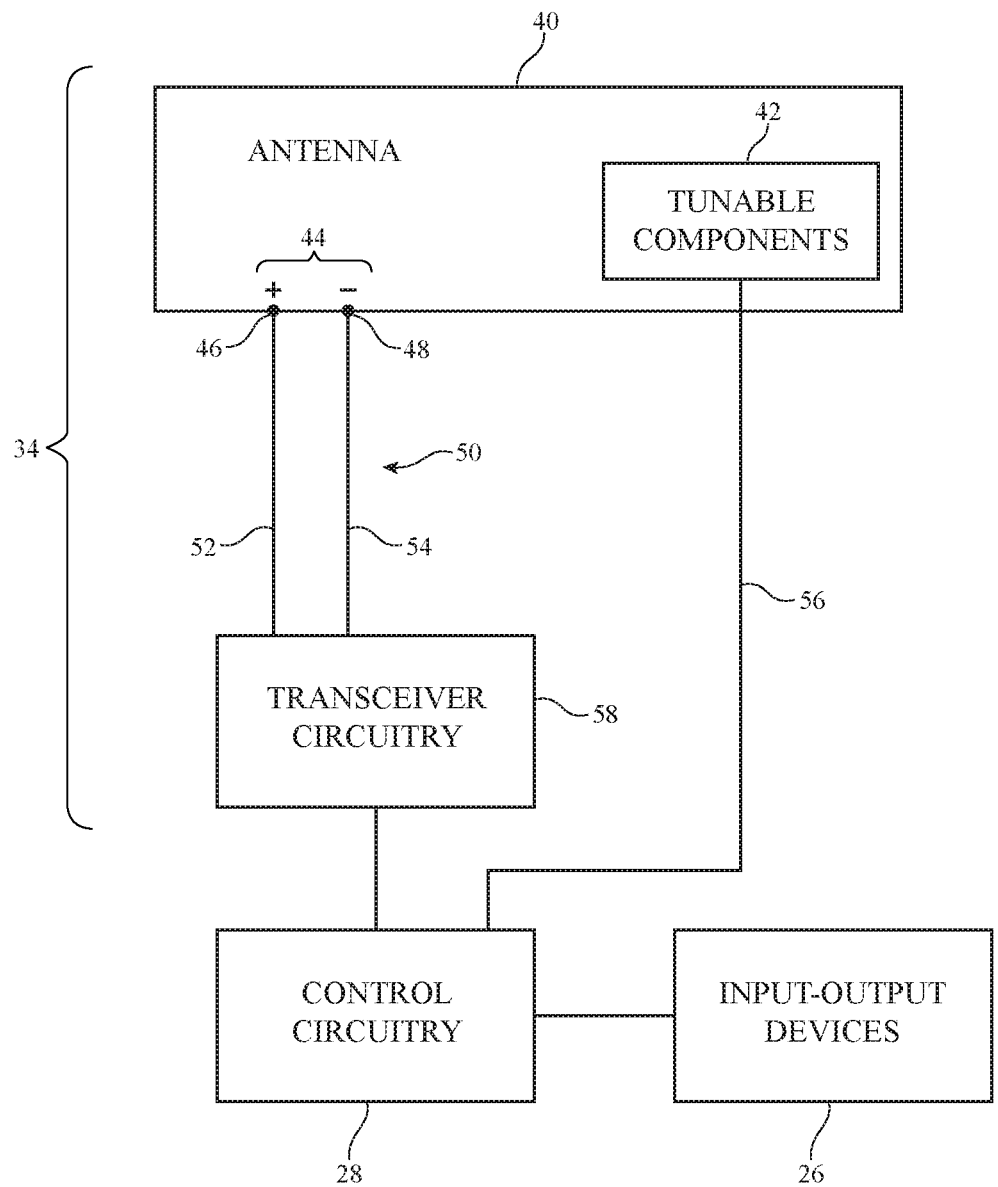
FIG. 3 is a schematic diagram of illustrative wireless circuitry in accordance with some embodiments.

A schematic diagram of wireless circuitry 34 is shown in FIG. 3. As shown in FIG. 3, wireless circuitry 34 may include transceiver circuitry 58 (e.g., satellite navigation receiver circuitry 36 or non-satellite transceiver circuitry 38 of FIG. 2) that is coupled to a given antenna 40 using a path such as path 50. Wireless communications circuitry 34 may be coupled to control circuitry 28. Control circuitry 28 may be coupled to input-output devices 26. Input-output devices 26 may supply output from device 10 and may receive input from sources that are external to device 10.

To provide antenna structures such as antenna 40 with the ability to cover different frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components 42 to tune the antenna over communications (frequency) bands of interest. Tunable components 42 may be part of a tunable filter or tunable impedance matching network, may be part of an antenna resonating element, may span a gap between an antenna resonating element and antenna ground, etc.

Tunable components 42 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of device 10, control circuitry 28 may issue control signals on one or more paths such as path 56 that adjust inductance values, capacitance values, or other parameters associated with tunable components 42, thereby tuning antenna 40 to cover desired frequency bands. Antenna tuning components that are used to adjust the frequency response of antenna 40 such as tunable components 42 may sometimes be referred to herein as antenna tuning components, tuning components, antenna tuning elements, tuning elements, adjustable tuning components, adjustable tuning elements, or adjustable components. Tunable components 42 may be used to tune the frequency response of antenna 40 to cover both a satellite navigation frequency band (e.g., the L1 or L5 band) and one or more cellular telephone frequency bands (e.g., a cellular low band, cellular midband, and/or cellular high band).

Path 50 may include one or more transmission lines. As an example, path 50 of FIG. 3 may be a transmission line having a positive signal conductor such as line 52 and a ground signal conductor such as line 54. Path 50 may sometimes be referred to herein as transmission line 50 or radio-frequency transmission line 50. Line 52 may sometimes be referred to herein as positive signal conductor 52, signal conductor 52, signal line conductor 52, signal line 52, positive signal line 52, signal path 52, or positive signal path 52 of transmission line 50. Line 54 may sometimes be referred to herein as ground signal conductor 54, ground conductor 54, ground line conductor 54, ground line 54, ground signal line 54, ground path 54, or ground signal path 54 of transmission line 50.

Transmission line 50 may, for example, include a coaxial cable transmission line (e.g., ground conductor 54 may be implemented as a grounded conductive braid surrounding signal conductor 52 along its length), a stripline transmission line, a microstrip transmission line, coaxial probes realized by a metalized via, an edge-coupled microstrip transmission line, an edge-coupled stripline transmission line, a waveguide structure (e.g., a coplanar waveguide or grounded coplanar waveguide), combinations of these types of transmission lines and/or other transmission line structures, etc.

Transmission lines in device 10 such as transmission line 50 may be integrated into rigid and/or flexible printed circuit boards. In one suitable arrangement, transmission lines such as transmission line 50 may also include transmission line conductors (e.g., signal conductors 52 and ground conductors 54) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process)

without adhesive (e.g., as opposed to performing multiple pressing processes to laminate multiple layers together with adhesive).

A matching network (e.g., an adjustable matching network formed using tunable components 42) may include components such as inductors, resistors, and capacitors used in matching the impedance of antenna 40 to the impedance of transmission line 50. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Transmission line 50 may be coupled to antenna feed structures associated with antenna 40. As an example, antenna 40 may form an inverted-F antenna, a slot antenna, a hybrid inverted-F slot antenna or other antenna having an antenna feed 44 with a positive antenna feed terminal such as terminal 46 and a ground antenna feed terminal such as ground antenna feed terminal 48. Signal conductor 52 may be coupled to positive antenna feed terminal 46 and ground conductor 54 may be coupled to ground antenna feed terminal 48. Positive antenna feed terminal 46 may be coupled to an antenna resonating element of antenna 40 whereas ground antenna feed terminal 48 is coupled to a ground plane of antenna 40 (sometimes referred to herein as an antenna ground), for example. Other types of antenna feed arrangements may be used if desired. For example, antenna 40 may be fed using multiple feeds each coupled to a respective port of transceiver circuitry 58 over a corresponding transmission line. If desired, signal conductor 52 may be coupled to multiple locations on antenna 40 (e.g., antenna 40 may include multiple positive antenna feed terminals coupled to signal conductor 52 of the same transmission line 50). Switches may be interposed on the signal conductor between transceiver circuitry 58 and the positive antenna feed terminals if desired (e.g., to selectively activate one or more positive antenna feed terminals at any given time). The illustrative feeding configuration of FIG. 3 is merely illustrative.

Figure 4:
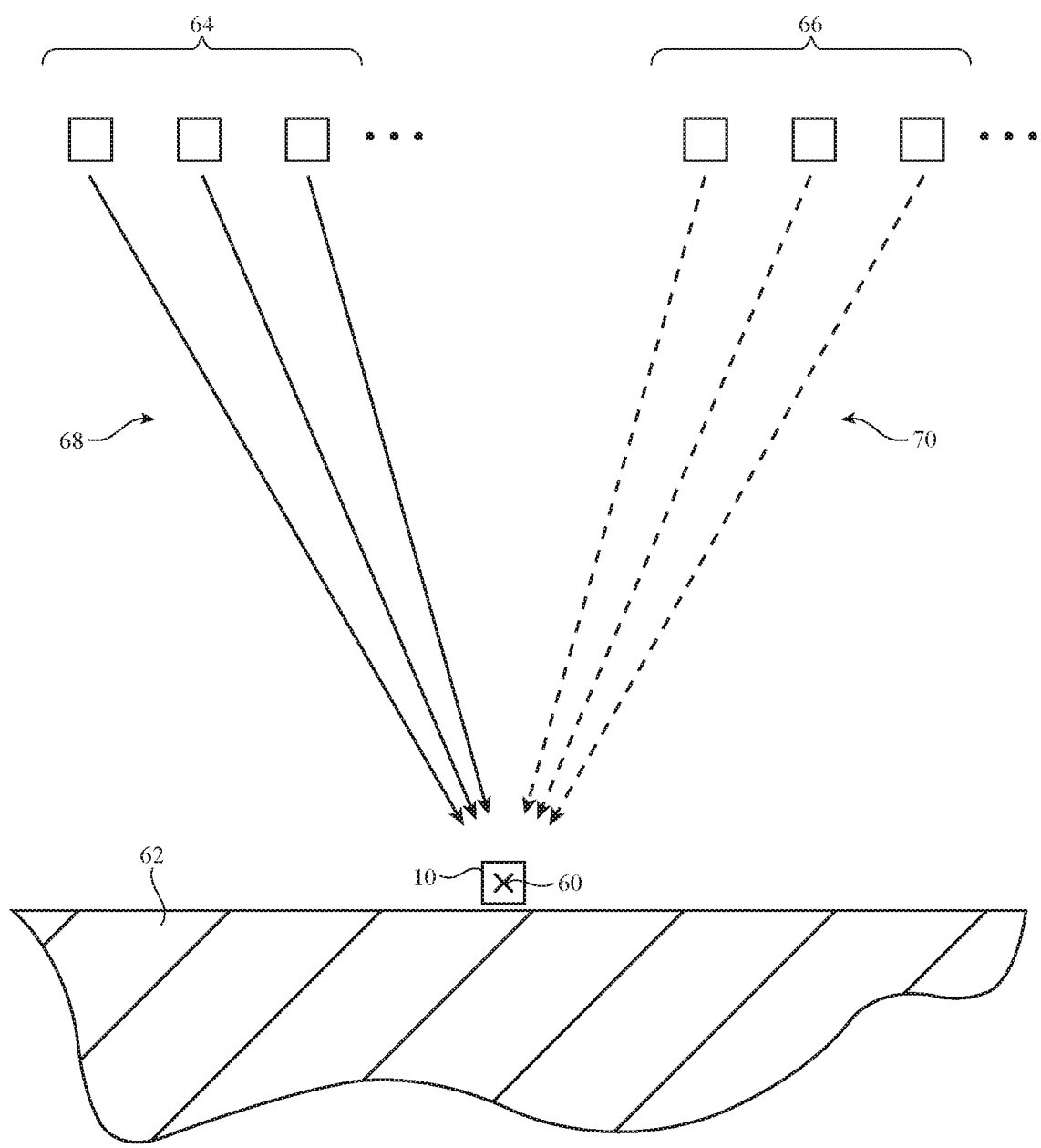
FIG. 4 is a diagram showing how an illustrative electronic device may use satellite navigation signals from different sets of satellites to perform multi-band satellite navigation operations in accordance with some embodiments.

Different antennas 40 in device 10 may be used to perform satellite navigation operations using different respective satellite navigation frequency bands. FIG. 4 is a diagram showing how device 10 may perform satellite navigation operations using multiple satellite navigation frequency bands. As shown in FIG. 4, device 10 may be located at geographic location 60 on Earth 62. Different sets of satellites (sometimes referred to as groups or constellations of satellites) such as a first set of satellites 64 and a second set of satellites 66 may be located in space over Earth 62. The first set of satellites 64 may transmit (broadcast) satellite navigation signals 68 in a first satellite navigation frequency band (e.g., the L1 band). The second set of satellites 66 may broadcast satellite navigation signals 70 in a second satellite navigation frequency band (e.g., the L5 band). Antennas on device 10 may receive satellite navigation signals 68 and 70 and control circuitry 28 (FIG. 2) may process the received satellite navigation signals to identify (e.g., triangulate) the geographic location 60 of device 10 on Earth 62 (e.g., based on the satellite navigation protocols such as GPS protocols associated with satellite navigation signals 68 and 70). Identifying the location of device 10 using multiple different satellite navigation frequency bands may allow device 10 to identify its location with greater precision and/or accuracy than when only a single satellite navigation frequency band is used (e.g., device 10 may identify geographic location 60 with greater precision and accuracy by processing satellite navigation signals received in both the L1 band and the L5 band than in scenarios where device 10 identifies its location using only satellite navigation signals in the L1 band).

Device 10 may include different antennas for handling different respective satellite navigation frequency bands. For example, device 10 may include a first antenna for handling the L1 band and a second antenna for handling the L5 band. In order to conserve space within device 10, these antennas may also be used to cover non-satellite frequency bands such as one or more cellular telephone frequency bands.

Figure 5:
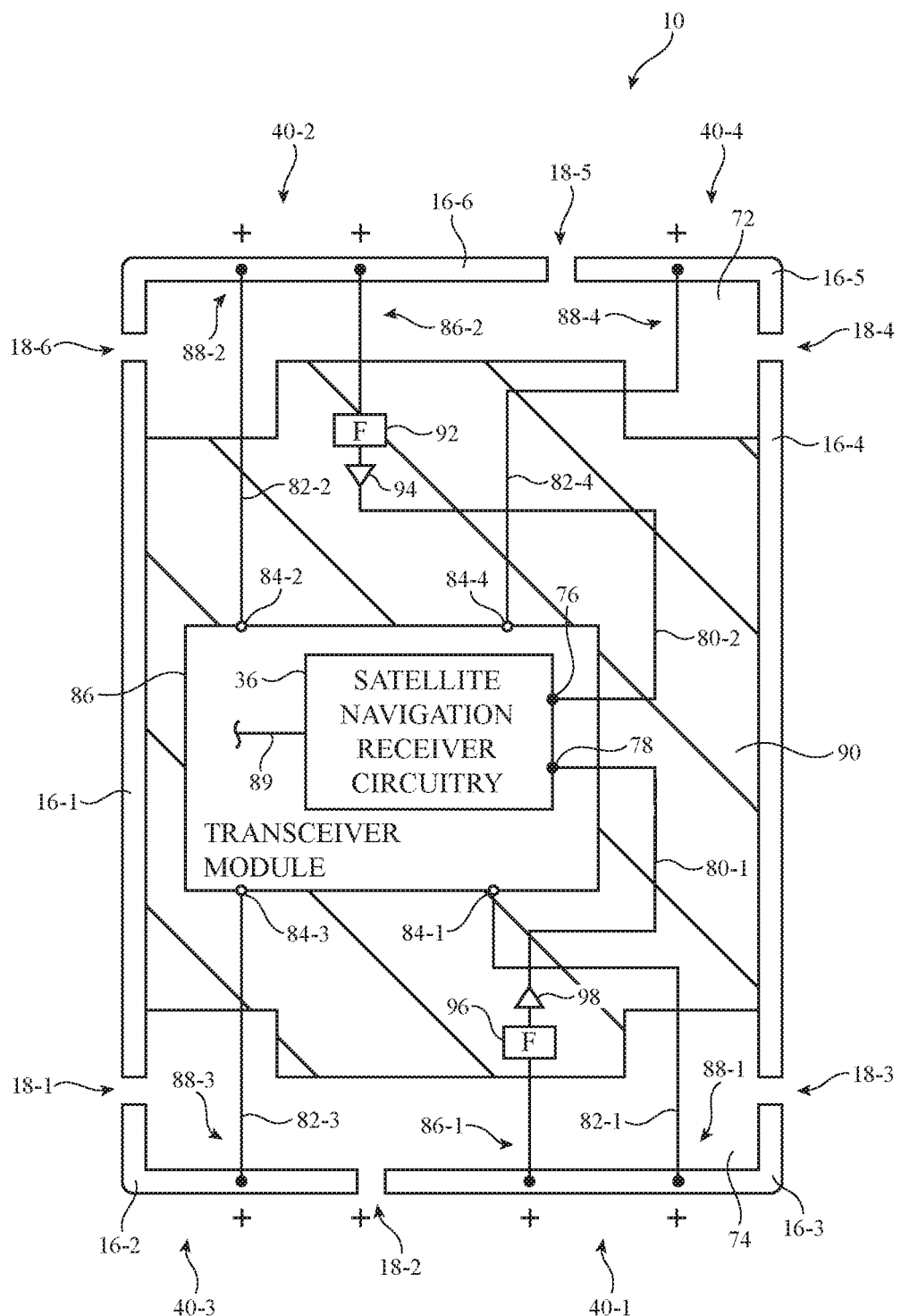
FIG. 5 is a top view of illustrative circuitry in an electronic device for performing multi-band satellite navigation operations using multiple antennas in accordance with some embodiments.

FIG. 5 is a top view of device 10 illustrating how different antennas may be used to cover different frequency bands. As shown in FIG. 5, peripheral conductive housing structures 16 may be segmented by dielectric-filled gaps 18 (e.g., plastic gaps) that divide peripheral conductive housing structures 16 into segments. Gaps 18 may include a first gap 18-1, a second gap 18-2, a third gap 18-3, a fourth gap 18-4, a fifth gap 18-5, and a sixth gap 18-6. Gaps 18-6 and 18-1 may be formed on the left side of device 10, gaps 18-4 and 18-3 may be formed on the right side of device 10, gap 18-2 may be formed on the bottom side of device 10, and gap 18-5 may be formed on the top side of device 10. Gap 18-6 may separate a first segment 16-1 of peripheral conductive housing structures 16 from a sixth segment 16-6 of peripheral conductive housing structures 16. Gap 18-5 may separate sixth segment 16-6 from a fifth segment 16-5 of peripheral conductive housing structures 16. Gap 18-4 may separate fifth segment 16-5 from a fourth segment 16-4 of peripheral conductive housing structures 16. Gap 18-3 may separate fourth segment 16-4 of peripheral conductive housing structures 16 from a third segment 16-3 of peripheral conductive housing structures 16. Gap 18-2 may separate third segment 16-3 from second segment 16-2 of peripheral conductive housing structures 16. Gap 18-1 may separate second segment 16-2 from first segment 16-1 of peripheral conductive housing structures 16.

Device 10 may include ground structures 90. Ground structures 90 may include one or more planar metal layers such as a metal layer used to form a rear housing wall for device 10, a metal layer that forms an internal support structure for device 10, conductive traces on a printed circuit board, and/or any other desired conductive layers in device 10. Ground structures 90 may extend from segment 16-1 to segment 16-4 of peripheral conductive housing structures 16. Ground structures 90 may be coupled to segments 16-1 and 16-4 using conductive adhesive, solder, welds, conductive screws, conductive pins, and/or any other desired conductive interconnect structures. If desired, ground structures 90 and segments 16-1 and 16-4 may be formed from different portions of a single integral conductive structure (e.g., a conductive housing for device 10).

Ground structures 90 need not be confined to a single plane and may, if desired, include multiple layers located in different planes or non-planar structures. Ground structures 90 may include conductive (e.g., grounded) portions of other electrical components within device 10. For example, ground structures 90 may include conductive portions of display 14 of FIG. 1. Conductive portions of the display may include a metal frame for the display, a metal backplate for the display, shielding layers or shielding cans for the display, pixel circuitry in the display, touch sensor circuitry (e.g., touch sensor electrodes) for the display, and/or any other desired conductive structures in the display or used for mounting the display to the housing for device 10.

Ground structures 90 and segments 16-6, 16-5, 16-3, and 16-2 may be used in forming different antennas for device 10. For example, device 10 may include a first antenna 40-1 formed from segment 16-3 and ground structures 90, a second antenna 40-2 formed from segment 16-6 and ground structures 90, a third antenna 40-3 formed from segment 16-2 and ground structures 90, and a fourth antenna 40-4 formed from segment 16-5 and ground structures 90. As an example, the resonating element for antenna 40-4 may include an inverted-F antenna resonating element arm that is formed from segment 16-5. The resonating element for antenna 40-3 may include an inverted-F antenna resonating element arm that is formed from segment 16-2. Similarly, the resonating element for antenna 40-2 may include an inverted-F antenna resonating element arm that is formed from segment 16-6 and the resonating element for antenna 40-1 may include an inverted-F antenna resonating element arm that is formed from segment 16-3. This example is merely illustrative and, in general, antennas 40-1, 40-2, 40-3, and 40-4 may include any desired antenna resonating element structures (e.g., slot antenna resonating elements, monopole antenna resonating elements, etc.).

Segments 16-6 and 16-5 may be separated from ground structures 90 by slot 72. Segments 16-2 and 16-3 may be separated from ground structures 90 by slot 74. Air and/or other dielectric material may fill slots 72 and 74. Portions of slot 72 may contribute slot resonances to antennas 40-2 and 40-4 and portions of slot 74 may contribute slot resonances to antennas 40-3 and 40-1, if desired.

Each antenna may include one or more antenna feeds (e.g., antenna feed 44 of FIG. 3). In the example of FIG. 5, antenna 40-2 includes a first antenna feed 86-2 and a second antenna feed 88-2 coupled across slot 72, antenna 40-4 includes antenna feed 88-4 coupled across slot 72, antenna 40-1 includes a first antenna feed 86-1 and a second antenna feed 88-1 coupled across slot 74, and antenna 40-3 includes antenna feed 88-3 coupled across slot 74. Only the positive antenna feed terminals (e.g., positive antenna feed terminal 46 of FIG. 3) of antenna feeds 88-1, 88-2, 88-3, 88-4, 86-1, and 86-2 are shown in FIG. 5 for the sake of clarity. In general, each antenna feed also includes a corresponding ground antenna feed terminal (e.g., ground antenna feed terminal 48 of FIG. 3) coupled to ground structures 90. The example of FIG. 5 is merely illustrative. In general, antennas 40-1, 40-2, 40-3, and 40-4 may include any desired number of antenna feeds.

Ground structures 90 and segments 16-1 and 16-4 may form portions of the antenna ground for antennas 40-1, 40-2, 40-3, and 40-4. If desired, slot 74 may be configured to form slot antenna resonating element structures that contribute to the overall performance of antennas 40-3 and/or 40-1. Slot 74 may extend from gap 18-1 to gap 18-2 (e.g., the ends of slot 74 which may sometimes be referred to as open ends, may be formed by gaps 18-1 and 18-2). Slot 74 may have an elongated shape having any suitable length (e.g., about 4-20 cm, more than 2 cm, more than 4 cm, more than 8 cm, more than 12 cm, less than 25 cm, less than 10 cm, etc.) and any suitable width (e.g., approximately 2 mm, less than 2 mm, less than 3 mm, less than 4 mm, 1-3 mm, etc.). Gap 18-2 may be continuous with and extend perpendicular to the longitudinal axis of the longest a portion of slot 74 (e.g., the portion of slot 74 extending from the left to the right of FIG. 5). If desired, slot 74 may include vertical portions that extend parallel to the longitudinal axis of device 10 and upwards beyond gaps 18-1 and 18-2 (e.g., towards slot 72).

Similarly, slot 72 may be configured to form slot antenna resonating element structures that contribute to the overall performance of antennas 40-4 and/or 40-2. Slot 72 may extend from gap 18-6 to gap 18-4 (e.g., the ends of slot 72 may be formed by gaps 18-6 and 18-4). Slot 72 may have an elongated shape having any suitable length (e.g., about 4-20 cm, more than 2 cm, more than 4 cm, more than 8 cm, more than 12 cm, less than 25 cm, less than 10 cm, etc.) and any suitable width (e.g., approximately 2 mm, less than 2 mm, less than 3 mm, less than 4 mm, 1-3 mm, etc.). Gap 18-5 may be continuous with and extend perpendicular to the longitudinal axis of the longest a portion of slot 72. If desired, slot 72 may include vertical portions that extend parallel to the longitudinal axis of device 10 and downwards beyond gaps 18-6 and 18-4 (e.g., towards slot 74).

Slots 72 and 74 may be filled with dielectric such as air, plastic, ceramic, or glass. For example, plastic may be inserted into portions of slots 72 and 74 and this plastic may be flush with the exterior of the housing for device 10. Dielectric material in slot 72 may lie flush with dielectric material in gaps 18-6, 18-5, and 18-4 at the exterior of the housing if desired. Dielectric material in slot 74 may lie flush with dielectric material in gaps 18-1, 18-3, and 18-2 at the exterior of the housing. The example of FIG. 5 in which slots 72 and 74 each have a U-shape is merely illustrative. If desired, slots 72 and 74 may have any other desired shapes (e.g., rectangular shapes, meandering shapes having curved and/or straight edges, etc.).

As shown in FIG. 5, device 10 may include transceiver module 86. Transceiver module 86 may overlap and/or be mounted to ground structures 90 or may be formed elsewhere within device 10. Transceiver module 86 may include satellite navigation receiver circuitry 36 and other non-satellite transceiver circuitry (e.g., non-satellite transceiver circuitry 38 of FIG. 2). Transceiver module 86 may include an integrated circuit (chip), integrated circuit package, printed circuit board (e.g., rigid printed circuit board and/or flexible printed circuit), or other substrate (e.g., a substrate to which satellite navigation receiver circuitry 36 and the non-satellite transceiver circuitry are mounted). Transceiver module 86 may be coupled to the antennas in device 10 using different transmission lines such as transmission lines 82-1, 82-2, 82-3, 82-4, 80-1, and 8-2 (e.g., radio-frequency transmission lines such as transmission line 50 of FIG. 3).

Satellite navigation receiver circuitry 36 may have multiple radio-frequency ports. Each port may handle a different satellite navigation frequency band. In the example of FIG. 5, satellite navigation receiver circuitry 36 has a first port 76 and a second port 78. First port 76 may handle the L1 band whereas second port 78 handles the L5 band, as an example. Port 76 may be coupled to antenna feed 86-2 on antenna 40-2 by transmission line 80-2. Port 78 may be coupled to antenna feed 86-1 on antenna 40-1 by transmission line 80-1. Satellite navigation receiver circuitry 36 may receive satellite navigation signals in the L1 band (e.g., satellite navigation signals 68 from the set of satellites 64 as shown in FIG. 4) using antenna 40-2, antenna feed 86-2, transmission line 80-2, and port 76. Similarly, satellite navigation receiver circuitry 36 may receive satellite navigation signals in the L5 band (e.g., satellite navigation signals 70 from the set of satellites 66 as shown in FIG. 4) using antenna 40-1, antenna feed 86-1, transmission line 80-1, and port 78.

Amplifier circuitry such as low noise amplifier 94 may be interposed on transmission line 80-2 for amplifying the satellite navigation signals received in the L1 band. Amplifier circuitry such as low noise amplifier 98 may be interposed on transmission line 80-1 for amplifying the satellite navigation signals received in the L5 band. Satellite navigation receiver circuitry 36 may convey the received satellite navigation signals to control circuitry 28 (FIG. 2) over data path 89 (e.g., after down-converting the satellite navigation signals to baseband frequencies and/or performing analog-to-digital conversion on the satellite navigation signals). The control circuitry may process the satellite navigation signals received over both antennas 40-1 and 40-2 to identify the geographic location of device 10.

In order to conserve space within device 10, antennas 40-1 and 40-2 may also be used in handling non-satellite frequency bands such as one or more cellular telephone frequency bands. If desired, device 10 may include antennas that handle non-satellite frequency bands without also handling satellite navigation frequency bands. For example, antennas 40-3 and 40-4 of FIG. 5 may handle cellular telephone communications without handling satellite navigation signals. Transceiver module 86 may include non-satellite radio-frequency ports such as ports 84-1, 84-2, 84-3, and 84-4 (e.g., radio-frequency ports of non-satellite transceiver circuitry 38 of FIG. 2). Port 84-2 may be coupled to antenna feed 88-2 of antenna 40-2 by transmission line 82-2, port 84-4 may be coupled to antenna feed 88-4 of antenna 40-4 by transmission line 82-4, port 84-3 may be coupled to antenna feed 88-3 of antenna 40-3 by transmission line 82-3, and port 84-1 may be coupled to antenna feed 88-1 of antenna 40-1 by transmission line 82-1. Transceiver module 86 may convey non-satellite radio-frequency signals in non-satellite frequency bands using antenna 40-1 (e.g., over port 84-1, transmission line 82-1, and antenna feed 88-1), antenna 40-2 (e.g., over port 84-2, transmission line 82-2, and antenna feed 88-2), antenna 40-3 (e.g., over port 84-3, transmission line 82-3, and antenna feed 88-3), and/or antenna 40-4 (e.g., over port 84-4, transmission line 82-4, and antenna feed 88-4).

Filter circuitry such as filter circuitry 92 may be interposed on transmission line 80-2. Filter circuitry 92 may include antenna tuning circuitry (e.g., tunable components 42 of FIG. 3 and/or passive tuning components) that configures antenna 40-2 to cover the satellite navigation frequency band associated with port 76 (e.g., the L1 band). In general, the length of segment 16-6, the perimeter of slot 72, and the antenna tuning circuitry in filter circuitry 92 may configure antenna 40-2 to radiate within desired frequency bands and with desired bandwidths. For example, antenna 40-2 may be configured to radiate in both the non-satellite frequency bands associated with port 84-2 and in the L1 band associated with port 76. Similarly, filter circuitry such as filter circuitry 96 may be interposed on transmission line 80-1. Filter circuitry 96 may include antenna tuning circuitry (e.g., tunable components 42 of FIG. 3 and/or passive tuning components) that configures antenna 40-1 to cover the satellite navigation frequency band associated with port 78 (e.g., the L5 band). The length of segment 16-3, the perimeter of slot 74, and the antenna tuning circuitry in filter circuitry 96 may configure antenna 40-1 to radiate in both the non-satellite frequency bands associated with port 84-1 and in the L5 band associated with port 78. In practice, it can be difficult to extend the bandwidth of antenna 40-2 to also cover additional satellite navigation frequency bands such as the L5 band. By offloading coverage of the L5 band to antenna 40-1, antenna 40-2 may operate with satisfactory antenna efficiency in both the L1 band and the non-satellite frequency bands while antenna 40-1 operates with satisfactory antenna efficiency in both the L5 band and the non-satellite frequency bands.

Filter circuitry 92 and filter circuitry 96 may also include one or more filters (e.g., low pass filters, high pass filters, notch filters, bandpass filters, etc.) that block radio-frequency signals in non-satellite frequency bands from passing to ports 76 and 78. This may serve to isolate satellite navigation receiver circuitry 36 from the non-satellite radio-frequency signals that are also conveyed by antennas 40-1 and 40-2.

The example of FIG. 5 is merely illustrative. Additional tuning circuitry and/or impedance matching circuitry may be coupled to any desired locations on antennas 40-1, 40-2, 40-3, and 40-4. If desired, the same antenna feed may be used to convey radio-frequency signals in both satellite navigation frequency bands and non-satellite frequency bands (e.g., both ports 84-2 and 76 may be coupled to antenna feed 86-2 for feeding antenna 40-2 and both ports 84-1 and 78 may be coupled to antenna feed 86-1 for feeding antenna 40-1). More than two antennas may be used to receive radio-frequency signals in satellite navigation frequency bands if desired.

When performing communications in non-satellite frequency bands using a single antenna, a single stream of wireless data may be conveyed between device 10 and external communications equipment (e.g., one or more other wireless devices such as wireless base stations, access points, cellular telephones, computers, etc.). This may impose an upper limit on the data rate (data throughput) obtainable by device 10 in communicating with the external communications equipment. As software applications and other device operations increase in complexity over time, the amount of data that needs to be conveyed between device 10 and the external communications equipment typically increases, such that a single antenna may not be capable of providing sufficient data throughput for handling the desired device operations.

In order to increase the overall data throughput of wireless circuitry 34 (FIG. 2), multiple antennas may be operated using a multiple-input and multiple-output (MIMO) scheme. When operating using a MIMO scheme, two or more antennas on device 10 may be used to convey multiple independent streams of wireless data at the same frequency. This may significantly increase the overall data throughput between device 10 and the external communications equipment relative to scenarios where only a single antenna is used. In general, the greater the number of antennas that are used for conveying wireless data under the MIMO scheme, the greater the overall throughput of the wireless communications circuitry.

In order to perform wireless communications under a MIMO scheme, the antennas in device 10 need to convey data at the same frequencies. If desired, device 10 may perform so-called two-stream (2×) MIMO operations (sometimes referred to herein as 2×MIMO communications or communications using a 2×MIMO scheme) in which two antennas are used to convey two independent streams of radio-frequency signals at the same frequency. Device 10 may perform so-called four-stream (4×) MIMO operations (sometimes referred to herein as 4X MIMO communications or communications using a 4×MIMO scheme) in which four antennas are used to convey four independent streams of radio-frequency signals at the same frequency. Performing 4×MIMO operations may support higher overall data throughput than 2×MIMO operations because 4×MIMO operations involve four independent wireless data streams whereas 2×MIMO operations involve only two independent wireless data streams. If desired, antennas 40-1, 40-2, 40-3, and 40-4 of FIG. 5 may perform 2×MIMO operations in some non-satellite frequency bands and may perform 4×MIMO operations in other non-satellite frequency bands (e.g., depending on which bands are handled by which antennas). Antennas 40-1, 40-2, 40-3, and 40-4 may perform 2×MIMO operations in some non-satellite frequency bands concurrently with performing 4×MIMO operations in other non-satellite frequency bands, for example.

The presence of gap 18-5 may help to isolate antennas 40-2 and 40-4 when operating in the same non-satellite frequency bands and the presence of gap 18-2 may help to isolate antennas 40-1 and 40-3 when operating in the same non-satellite frequency bands. In this way, antennas 40-1, 40-2, 40-3, and 40-4 may collectively perform non-satellite communications (e.g., using a MIMO scheme) in one or more non-satellite frequency bands while concurrently receiving radio-frequency signals in two different satellite navigation frequency bands (e.g., the L1 and L5 bands). This may allow device 10 to perform bidirectional wireless communications with a high data rate while concurrently determining the location of device 10 with a high degree of accuracy and precision.

In another suitable arrangement, filter circuitry 92 and 96 may include switching circuitry that switches antennas 40-1 and 40-2 between first and second states. In the first state, antenna 40-1 may exhibit optimal performance in the L1 band and 40-2 may exhibit optimal performance in the L5 band while sacrificing some performance in one or more non-satellite frequency bands. In the second state, antennas 40-1 and 40-2 may exhibit optimal performance in the non-satellite frequency bands while sacrificing some performance in the L1 and L5 frequency bands.

Figure 6:
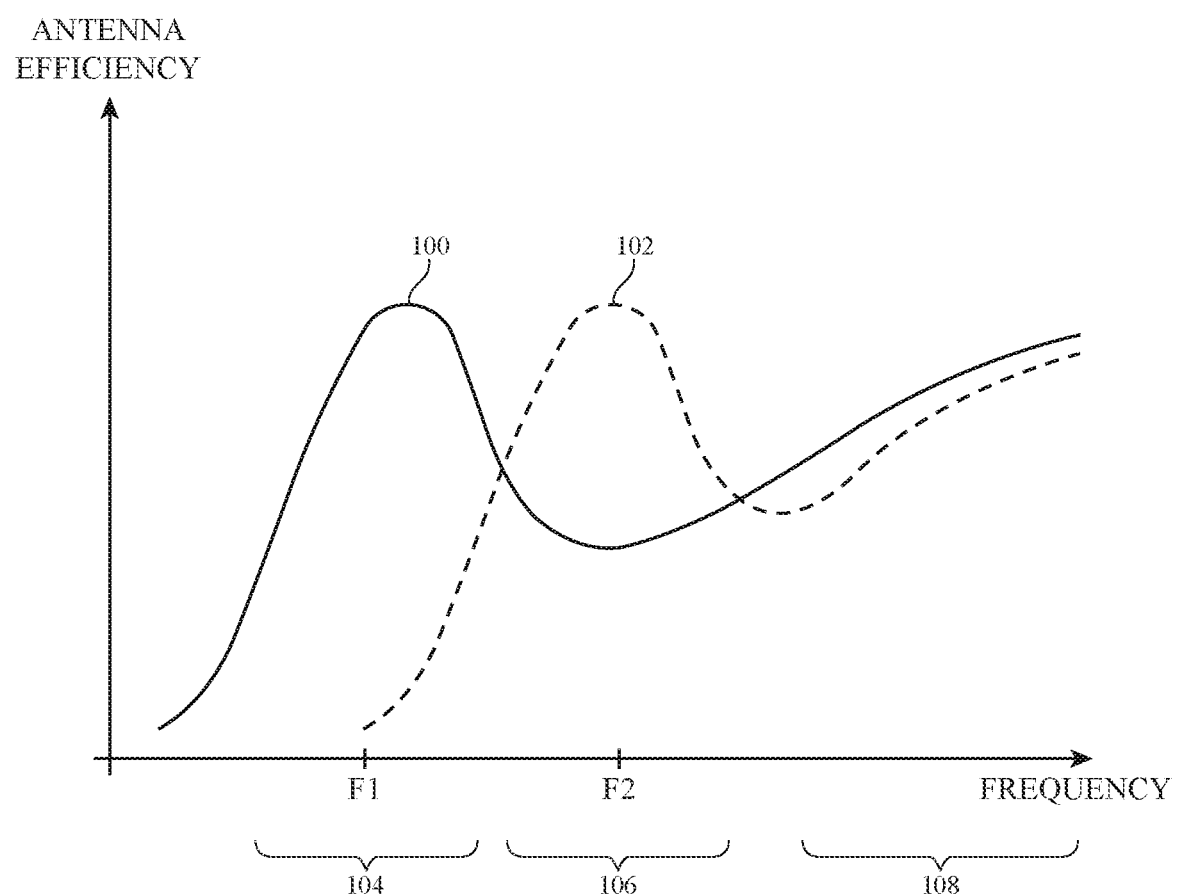
FIG. 6 is a plot of antenna performance (antenna efficiency) for illustrative antennas of the type shown in FIG. 5 in accordance with some embodiments.

FIG. 6 is a graph in which antenna performance (antenna efficiency) has been plotted as a function of operating frequency for antennas 40-1 and 40-2 of FIG. 5. As shown in FIG. 6, curve 100 plots an exemplary antenna efficiency of antenna 40-1 and curve 102 plots an exemplary antenna efficiency of antenna 40-2. As shown by curve 100, antenna 40-1 exhibits a response peak within frequency band 104 (e.g., the L5 frequency band at 1176 MHz) and a response peak at higher frequencies such as frequencies within band 108 (e.g., cellular telephone frequency bands, WLAN frequency bands, etc.). As shown by curve 102, antenna 40-2 exhibits a response peak within frequency band 106 (e.g., the L1 frequency band at 1575 MHz) and a response peak at higher frequencies such as frequencies within band 108. While antennas 40-1 and 40-2 may each be incapable of covering both bands 104 and 106 on their own with satisfactory efficiency, antennas 40-1 and 40-2 may collectively cover both bands 104 and 106 with satisfactory antenna efficiency (e.g., for performing multi-band satellite navigation operations).

The example of FIG. 6 is merely illustrative. In general, curves 100 and 102 may have other shapes if desired (e.g., curves 100 and 102 may also include response peaks at frequencies lower than band 104 such as frequencies within the cellular low band). Bands 104 and 106 may include any desired frequencies. Band 106 may include any desired satellite navigation frequency band at higher frequencies than band 104 (e.g., band 106 may include frequencies greater than 1300 MHz whereas band 104 includes frequencies less than 1300 MHz). Bands 104 and 106 may include the L1 band, the L2 band, the L3 band, the L4 band, the L5 band, or any other desired satellite navigation frequency bands.

Figure 7:
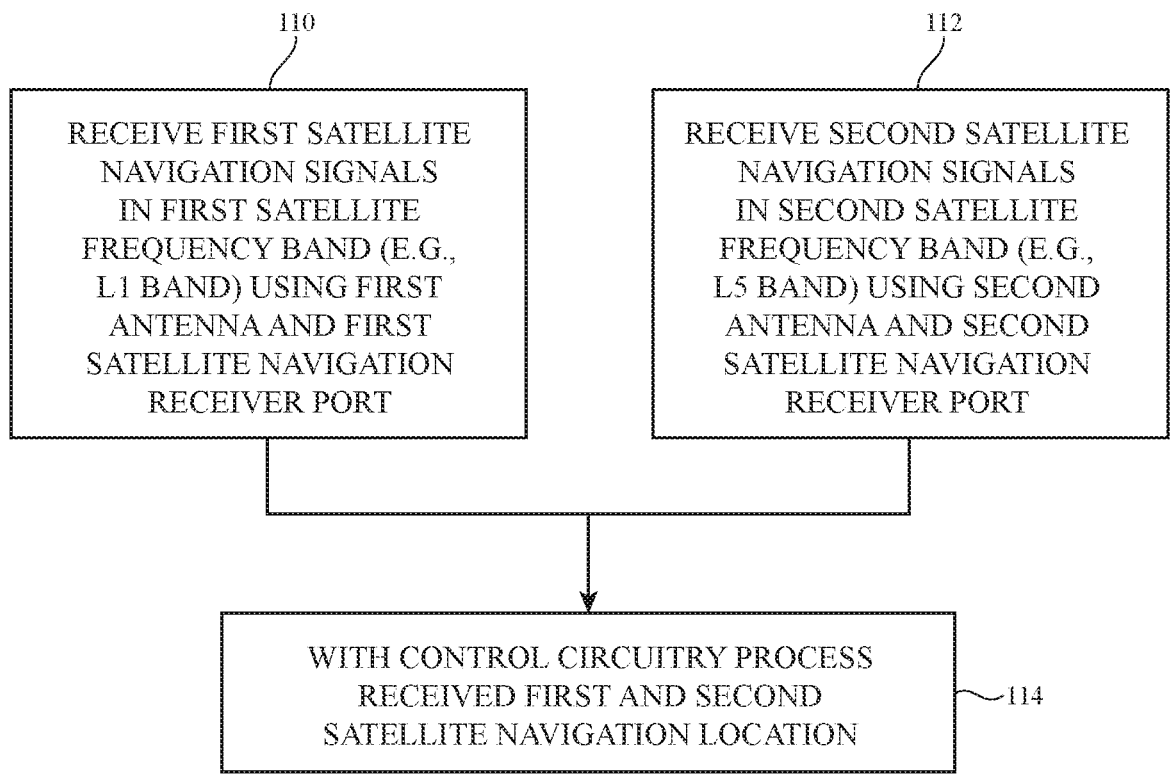
FIG. 7 is a flow chart of illustrative steps that may be involved in performing multi-band satellite navigation operations using multiple antennas in accordance with some embodiments.

FIG. 7 is a flow chart of illustrative steps that may be processed by device 10 in performing multi-band satellite navigation operations using antennas 40-1 and 40-2. At step 110, device 10 may receive first satellite navigation signals in a first satellite navigation frequency band (e.g., the L1 band) using antenna 40-2 and port 76 of satellite navigation receiver circuitry 36 (FIG. 5). The first satellite navigation signals may be broadcast by the first set of satellites 64 of FIG. 4, for example. The satellite navigation receiver circuitry may pass the first satellite navigation signals to control circuitry 28 (FIG. 2).

At step 112, device 10 may receive second satellite navigation signals in a second satellite navigation frequency band (e.g., the L5 band) using antenna 40-1 and port 78 of satellite navigation receiver circuitry 36 (FIG. 5). The second satellite navigation signals may be broadcast by the second set of satellites 66 of FIG. 4, for example. The satellite navigation receiver circuitry may pass the second satellite navigation signals to control circuitry 28 (FIG. 2). Step 112 may be performed concurrently (simultaneously) with step 110.

At step 114, control circuitry 28 may process the received first and second satellite navigation signals to identify the geographic location of device 10 (e.g., location 60 of FIG. 4). Device 10 may convey non-satellite radio-frequency signals in non-satellite frequency bands using antennas 40-1, 40-2, 40-3, and/or 40-4 of FIG. 5 (e.g., using a MIMO scheme) concurrently with zero, one, or more than one of steps 110-114 of FIG. 7.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
   a first antenna that includes a first antenna feed and that is configured to receive first radio-frequency signals in a first satellite navigation frequency band using the first antenna feed; and
   a second antenna that includes second and third antenna feeds and that is configured to receive second radio-frequency signals in a second satellite navigation frequency band using the second antenna feed and that is configured to transmit and receive third radio-frequency signals in a non-satellite frequency band using the third antenna feed, the second satellite navigation frequency band being different from the first satellite navigation frequency band, wherein the second antenna is configured to receive the second radio-frequency signals concurrently with the reception of the first radio-frequency signals by the first antenna.

2. The electronic device defined in claim 1, wherein the first antenna is configured to transmit fourth radio-frequency signals in the non-satellite frequency band.

3. The electronic device defined in claim 2, wherein the first antenna is configured to transmit the fourth radio-frequency signals concurrently with transmission of the third radio-frequency signals by the second antenna using a multiple-input and multiple-output (MIMO) scheme.

4. The electronic device defined in claim 3, further comprising:
   a third antenna configured to transmit fifth radio-frequency signals in the non-satellite frequency band; and
   a fourth antenna configured to transmit sixth radio-frequency signals in the non-satellite frequency band.

5. The electronic device defined in claim 4, wherein the non-satellite frequency band comprises a frequency band selected from the group consisting of: a cellular telephone frequency band, a wireless local area network frequency band, and a wireless personal area network frequency band.

6. The electronic device defined in claim 4, wherein the first satellite navigation frequency band comprises an L5 frequency band.

7. The electronic device defined in claim 1 wherein the first satellite navigation frequency band comprises a frequency greater than 1300 MHz and the second satellite navigation frequency band comprises a frequency less than 1300 MHz.

8. The electronic device defined in claim 7, wherein the first satellite navigation frequency band comprises an L5 frequency band and the second satellite navigation frequency band comprises an L1 frequency band.

9. The electronic device defined in claim 8, wherein the first antenna is configured to transmit fourth radio-frequency signals in the non-satellite frequency band.

10. The electronic device defined in claim 1, further comprising:
peripheral conductive housing structures having a first segment that forms a first antenna resonating element for the first antenna and a second segment that forms a second antenna resonating element for the second antenna; and
ground structures, wherein the ground structures are separated from the first antenna resonating element by a first slot and are separated from the second antenna resonating element by a second slot, the ground structures forming part of both the first and second antennas.

11. The electronic device defined in claim 10, further comprising a display mounted to the peripheral conductive housing structures and having conductive display structures that form part of the ground structures.

12. The electronic device defined in claim 1, further comprising:
satellite navigation receiver circuitry having a first port coupled to the first antenna and a second port coupled to the second antenna; and
control circuitry coupled to the satellite navigation receiver circuitry and configured to identify a location of the electronic device based on the received first and second radio-frequency signals.

13. An electronic device comprising:
an antenna ground;
peripheral conductive housing structures having a first segment separated from the antenna ground by a first slot and having a second segment separated from the antenna ground by a second slot;
a first antenna having a first antenna feed coupled to the first segment and the antenna ground across the first slot, wherein the first antenna is configured to receive first satellite navigation signals in a first frequency band and the first antenna is configured to convey first non-satellite radio-frequency signals in a non-satellite frequency band;
a second antenna having a second antenna feed coupled to the second segment and the antenna ground across the second slot, wherein the second antenna is configured to receive second satellite navigation signals in a second frequency band at higher frequencies than the first frequency band and the second antenna is configured to convey second non-satellite radio-frequency signals in the non-satellite frequency band; and
control circuitry configured to identify a geographic location of the electronic device based on the received first and second satellite navigation signals with a higher accuracy relative to a geographic location identified based on a single received satellite navigation signal.

14. The electronic device defined in claim 13, further comprising:
satellite navigation receiver circuitry having a first port coupled to the first antenna feed and a second port coupled to the second antenna feed.

15. The electronic device defined in claim 14, wherein the first antenna has a third antenna feed coupled to the first segment and the antenna ground across the first slot, the second antenna having a fourth antenna feed coupled to the second segment and the antenna ground across the second slot.

16. The electronic device defined in claim 15, wherein the first antenna is configured to convey the first non-satellite radio-frequency signals over the third antenna feed, the second antenna is configured to convey the second non-satellite radio-frequency signals over the fourth antenna feed, and the electronic device further comprises:
non-satellite transceiver circuitry having a third port coupled to the third antenna feed and having a fourth port coupled to the fourth antenna feed.

17. The electronic device defined in claim 16, further comprising:
a first radio-frequency transmission line coupled between the first port and the first antenna feed;
a second radio-frequency transmission line coupled between the second port and the second antenna feed;
first filter circuitry that is interposed on the first radio-frequency transmission line and that is configured to block the first non-satellite radio-frequency signals from passing to the first port; and
second filter circuitry that is interposed on the second radio-frequency transmission line and that is configured to block the second non-satellite radio-frequency signals from passing to the second port.

18. A cellular telephone, having a periphery comprising:
peripheral conductive housing structures that run around the periphery;
a dielectric gap in the peripheral conductive housing structures that divides the peripheral conductive housing structures into first and second segments and that extends from the first segment to the second segment;
a first antenna configured to receive first radio-frequency signals in an L5 frequency band, wherein the first antenna comprises a first antenna resonating element formed from the first segment;
a second antenna configured to receive second radio-frequency signals in an L1 frequency band, wherein the second antenna is configured to receive the second radio-frequency signals concurrently with the reception of the first radio-frequency signals by the first antenna and the second antenna comprises a second antenna resonating element formed from the second segment; and
control circuitry having a first port coupled to the first antenna and a second port coupled to the second antenna, wherein the control circuitry is configured to identify a geographic location of the cellular telephone using the concurrently received first and second radio-frequency signals.

19. The cellular telephone defined in claim 18, further comprising:
a third antenna configured to convey third radio-frequency signals in a cellular telephone frequency band; and
a fourth antenna configured to convey fourth radio-frequency signals in the cellular telephone frequency band.

* * * * *